July 10, 1962  E. O. HENRIQUES ETAL  3,043,334
GAS CYLINDER FITTING
Filed July 17, 1958
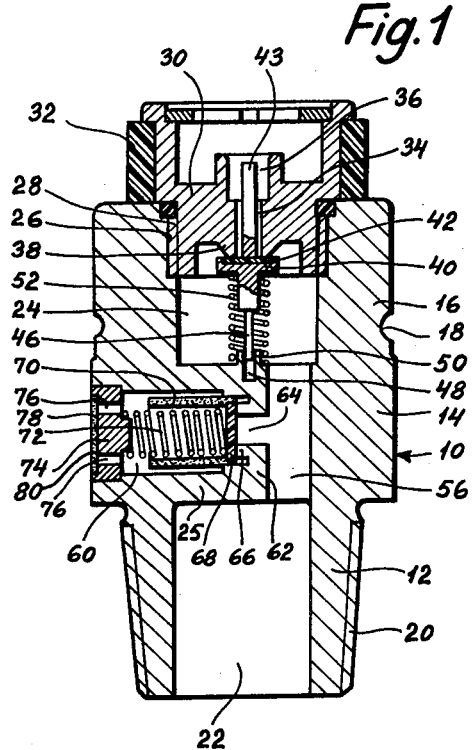
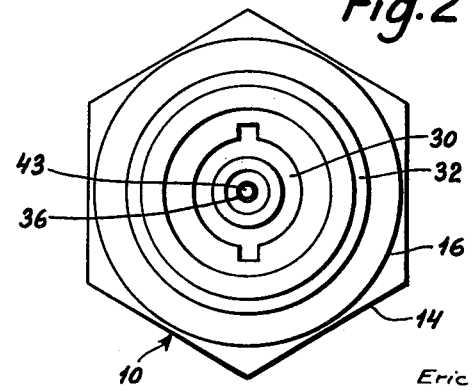
INVENTORS:
Eric Oscar Henriques
and Henning Ölund Rasmussen,
BY
Ernest D. Marmorek,
Their Attorney.

3,043,334
GAS CYLINDER FITTING
Eric Oscar Henriques and Henning Ölund Rasmussen, Nivaa, Denmark, assignors to A/S Kosangas, Copenhagen, Denmark, a company of Denmark
Filed July 17, 1958, Ser. No. 749,283
4 Claims. (Cl. 137—588)

This invention relates to a gas cylinder fitting including a discharge valve, preferably simultaneously serving as a filling valve, and a safety valve which is independent of the discharge valve, said two valves being placed within a body intended for being inserted to the neck of a gas cylinder, gas tank, or the like gas container, preferably for bottled gas.

Originally, in such gas cylinder fittings the discharge valve and the safety valve were completely separated from each other, and the body included a separate passage for each valve. Such a design is, however, in many respects deficient. Thus it demands a body having a relatively large diameter which makes it necessary that also the diameter of the gas cylinder neck must have a relatively large diameter which weakens the gas cylinder. Further the manufacturing costs of such a fitting are relatively large.

Later, gas cylinder fittings were used, in which the discharge valve and the safety valve were combined in a unit which could be disposed within a body with a relatively small outer diameter and provided with only one passage for the gas. By such a construction, however, it is difficult to obtain a sufficiently large flow area for blowing off the gas through the safety valve, especially in cases where the discharge valve is intended for being operated by means of a special pressure regulator mounted on the body and through which the blown-off gas needs to escape.

An object of the invention is to provide a gas cylinder fitting, by which the safety valve is disposed independently of the discharge valve in such a manner that a body with relatively small outer dimensions may be used and a large flow area for the gas blow-off by the safety valve is available.

A further object of the invention is to provide a gas cylinder fitting of the kind stated with a simple discharge valve.

Another object of the invention is to provide a gas cylinder fitting of the kind stated by which if viewed from the outside it is possible to ascertain whether or not the safety valve has been used.

Other objects and advantages will be apparent from the following detailed description in conjunction with the accompanying drawing, in which FIG. 1 is a vertical sectional view of a fitting illustrating a preferred embodiment of the invention, and FIG. 2 is a top plan view of the fitting shown in FIG. 1.

The fitting shown has a body 10 with a lower somewhat tapered part 12, an intermediate hexagonal part 14, and an upper cylindrical part 16. The part 16 is outwardly provided with a groove 18 serving for receiving balls of a ball-fastening-device on a pressure regulator, not shown, to be removably mounted on the fitting.

The lower part 12 is to be permanently fitted in and secured to a gas cylinder neck or opening. The part 12 may be secured to the gas cylinder or a gas container in many different ways, for example by welding. In the embodiment shown, however, the part 12 is provided with an external thread 20 for being secured to the gas cylinder by screwing in.

Within the lower part 12 of the body a bore or compartment 22 is provided having a relatively great diameter and extending upwardly from the bottom of the body 10 to a distance corresponding to the length of the lower part 12. A corresponding bore or compartment 24 is provided for in the upper part 16. The bore 24 is divided from the lower compartment 22 by means of a wall 25 having a thickness approximately equal to the height of the intermediate body part 14. This compartment 24 is at its upper end provided with a threaded enlargement 26 which receives the threaded part 28 of a valve bushing 30 closing the upper end of the compartment 24. The valve bushing 30 is at its upper end surrounded by a sealing ring 32 for tightening between the fitting shown and the above stated pressure regulator.

The valve bushing 30 is provided with a central gas outlet passage 34 having an enlargement 36 at its upper end. At its opening into the compartment 24, the passage 26 is surrounded by a discharge valve seat 38 co-operating with a movable discharge valve member 40 and with a sealing ring 42. This member 40 is provided with a downwardly extending guide stud or pin 46, the lower end of which is guided into a hole 48 formed in the bottom of the compartment 24 or into a protruding part 50 thereof.

The stud 46 is surrounded by a valve spring 52 inserted between the valve member 40 and the bottom of the compartment 24 and is able to move the valve member 40 towards the valve seat 38 to a closed position. From the upper side of the valve member 40 a spindle 43 extends upwardly through the passage 34 and ends some distance below the upper opening of the enlargement 36. The valve spindle 43 may be operated in various ways for the opening of the valve, for example by means of an opening member of the previously stated pressure regulator to be mounted on the upper part 16 of the body 10.

The compartments 22 and 24 are interconnected by means of a main passage 56 through the wall 25. This passage 56 is positioned eccentrically to the axis of the body 10 and thereby to the upper compartment 24.

Extending from the side of the hexagonal part 14 having the greatest distance from the eccentrically positioned main passage 56, a side bore 60 is provided within the wall 25 in a direction towards passage 56. The side bore 60 is divided from the passage 56 by means of a shoulder 62 provided with a transverse passage or opening 64 connecting the side bore 60 and the passage 56.

At the opening into the side bore 60 the transverse passage 64 is surrounded by a safety valve seat 66 co-operating with a safety valve member 68. Valve member 68 is provided with a tubular extension 70 within which the front end of a compression spring 72 is inserted, the rear end of which abuts a disc 74. The disc 74 is provided with openings 76 and is screwed into the threaded outer end of the side bore 60 and thus serves for the closing of the same. The spring 72 urges the valve member 68 towards the valve seat 66 for closing the safety valve constituted by the valve member 68 and the valve seat 66.

It is owing to the eccentrical positioning of the main passage 56 that it is possible to obtain sufficient space within the relatively thin body 10 for the side bore 60 with the safety valve since the said positioning of the main passage 56 makes it possible to give the side bore a length greater than half the diameter of the body 10.

At its outer side the disc 74 is provided with a recess 78 within which a cover disc 80, for example made from plastic, is pressed. This cover disc 80 covers normally the openings 76 and thereby prevents dust and other impurities from penetrating into the safety valve. When owing to an over pressure within the gas cylinder, the safety valve begins to function as the gas pressure will force the cover disc 80 out of the recess 78 so that the gas can flow through the openings 76. The absence of disc 80 shows that the safety valve has been in function.

The reason the lower part 12 of the body 10 is provided with the compartment 22 is that there is obtained a reduction of the weight of the fitting and also the drilling of the eccentrically positioned main passage 56 is facilitated.

While we have described a specific embodiment of our invention, it is to be understood that various changes may be resorted to without departing from the spirit of our invention, as expressed by the subjoined claims.

We claim:
1. A gas cylinder fitting comprising in combination a body, the lower part of which being adapted for insertion into and fastening to a gas cylinder; said body having an upwardly open upper compartment and a downwardly open lower compartment; a partition wall separating said two compartments and being disposed above said lower part of said body; a straight main passage defined in said partition wall connecting said two compartments; a valve bushing having a gas outlet passage inserted in the upper portion of said upper compartment; a valve member received in said upper compartment; resilient means disposed in said upper compartment and coaxial with said valve member and said gas outlet passage urging said valve member towards said valve bushing; said valve member and said valve bushing cooperating to form a discharge valve operable to be opened by force exerted against the valve member and overcoming the power of said resilient means; said body further having a side bore extending into said partition wall from the outer side of said body; a shoulder dividing said side bore from said main passage and having an opening connecting at right angle said side bore and said main passage; an excess pressure safety valve member received in and disposed entirely within said side bore; means disposed in said bore and operable for resiliently urging said safety valve member against said shoulder; said safety valve member and said shoulder co-operating to form a safety valve, said main passage being positioned in said partition wall eccentrically of the center axis of said upper compartment and at the side of said partition wall opposite said side bore therein, thereby leaving said partition wall sufficiently long for said side bore to be deep enough to enclose said safety valve throughout the length thereof.

2. A gas fitting comprising in combination a body having an upwardly open upper compartment, and including a wall below said upper compartment, said wall defining a straight passage extending through said wall downwardly from said upper compartment and being open upwardly and downwardly, a discharge valve bushing having a gas outlet passage inserted in the upper portion of said upper compartment, a discharge valve member received in said upper compartment; resilient means coaxial with said discharge valve member and said gas outlet passage urging said valve member towards said bushing, said discharge valve member and said discharge valve bushing cooperating to form a discharge valve operable to be opened against the power of said resilient means by external force exerted against said valve member in a direction away from said discharge valve bushing, said body having a side bore extending into said wall from the outer side of said body; a shoulder dividing said side bore from said main passage and having an opening connecting at right angle said side bore and said main passage; an excess pressure safety valve member received in and disposed entirely within said side bore; and spring means disposed in said bore and urging said safety valve member against said shoulder, said safety valve member and said shoulder cooperating to form a safety valve, said main passage being positioned in said wall eccentrically of the center axis of said upper compartment and at the side of said wall opposite said side bore therein, thereby leaving said wall sufficiently long for said side bore to be deep enough to enclose said safety valve throughout the length thereof.

3. A gas cylinder fitting comprising in combination a body, the lower part of which being adapted for insertion into and fastening to a gas cylinder; said body having an upwardly open upper compartment and a downwardly open lower compartment; a partition wall separating said two compartments and being disposed above said lower part of said body; a straight main passage formed in said partition wall positioned eccentrically of the center axis of said upper compartment and connecting said two compartments; a valve bushing having a gas outlet passage inserted in the upper portion of said upper compartment; a valve member received in said upper compartment; resilient means coaxial with said valve member and said gas outlet passage urging said valve member towards said valve bushing; said resilient means having an end thereof supported by said partition wall; said valve member and said valve bushing co-operating to form a discharge valve operable to be opened by force exerted against the valve member and overcoming the power of said resilient means; said body further having a side bore extending into said partition wall from the outer side of said body having the greatest distance from said main passage; a shoulder dividing said side bore from said main passage and having an opening connecting at right angle said side bore and said main passage; an excess pressure safety valve member received in and disposed entirely within said side bore; means disposed in said bore and operable for resiliently urging said safety valve member against said shoulder; said safety valve member and said shoulder cooperating to form a safety valve.

4. A gas cylinder fitting as claimed in claim 2, a disc provided with a series of openings secured in the outer end of said side bore, said spring means comprising a compression spring within said side bore inserted between said disc and said safety valve member urging said safety valve member towards said shoulder, said disc having on its outer side a recess, and a cover pressed into said recess covering said openings of said disc and operable to be dislodged by gas escaping through said side bore and openings when the safety valve is opened.

References Cited in the file of this patent
UNITED STATES PATENTS

| | | |
|---|---|---|
| 1,166,584 | Estep | Jan. 4, 1916 |
| 1,175,208 | Vosler | Mar. 14, 1916 |
| 1,291,401 | Caven | Jan. 14, 1919 |
| 1,951,926 | Davidson | Mar. 20, 1934 |
| 2,307,309 | Thomas | Oct. 1, 1938 |
| 2,675,793 | Ziege | Apr. 20, 1954 |

FOREIGN PATENTS

| | | |
|---|---|---|
| 1,000,197 | Germany | Jan. 3, 1957 |